March 10, 1959        R. A. BARBERA        2,876,979
SHOCK ABSORPTION AND VIBRATION ISOLATOR
Filed Jan. 17, 1956
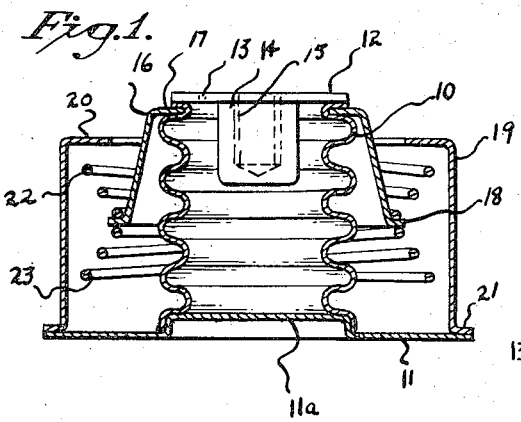
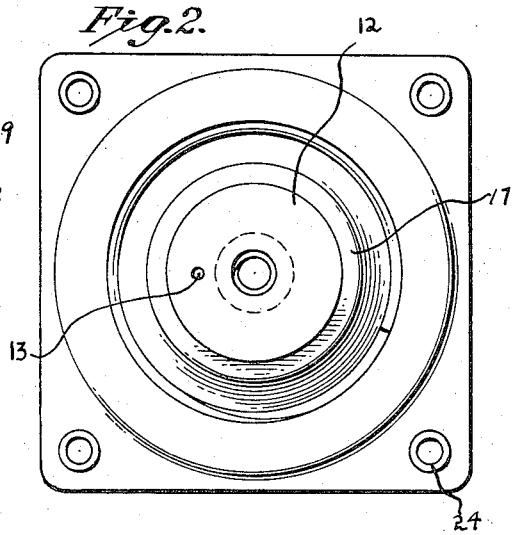
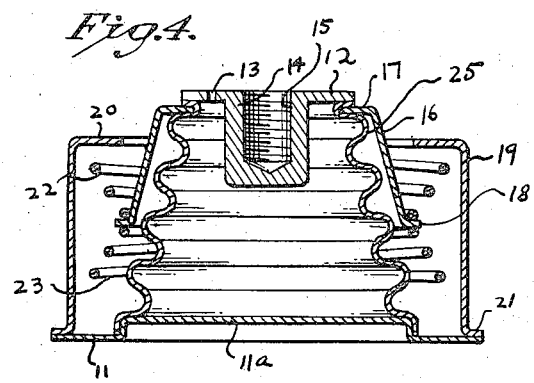
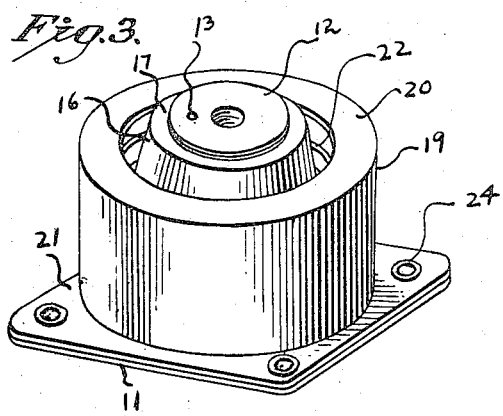
INVENTOR.
Robert A. Barbera
BY Kenyon and Kenyon
ATTORNEYS.

United States Patent Office 2,876,979
Patented Mar. 10, 1959

2,876,979

SHOCK ABSORPTION AND VIBRATION ISOLATOR

Robert A. Barbera, Reading, Mass.

Application January 17, 1956, Serial No. 559,648

9 Claims. (Cl. 248—358)

The present invention relates generally to devices for absorbing mechanical forces and more particularly to a unitary protective mount adapted both to isolate equipment supported thereby from shock impulses and to absorb vibratory disturbances.

When a mechanism or other piece of apparatus is rigidly attached to a supporting surface or base, disturbing mechanical forces imparted to the base will be transmitted to the apparatus. Conversely, when the disturbing forces are generated in the apparatus, as would be the case, for example, with rotating machinery, then these forces will be transmitted to the base.

To minimize the effect of such disturbances, it is known to introduce flexible elements or springs between the supporting base and the equipment mounted thereon to act as a vibration insulator or isolator, whereby the force transmitted is substantially reduced in intensity. For this vibration isolator to be effective with respect to continuous vibrations it is necessary that the isolating elements possess a high degree of resilience and flexibility. On the other hand, where the disturbing force is in the nature of a shock wave or impulse, in order to protect the apparatus from such transient forces it is desirable that the element interposed between the equipment and the base have properties of high energy absorption and low resilience.

Thus the characteristics which make for effective vibration isolation are to some extent incompatible with those characteristics providing effective shock absorption. Since in normal circumstances, the supported equipment is subject both to vibratory and shock disturbances, existing protective devices, while satisfactory with respect to one type of disturbance, fail to afford adequate isolation with respect to the other type of disturbance.

Accordingly, it is the principal object of this invention to provide a unitary mount acting both as a shock absorber and as a vibration isolator.

More specifically, it is an object of the invention to provide a unitary device of the above type which at any given moment is capable of acting as a shock absorber and at times as a vibration isolator and which is also adapted to function in a dual capacity. A significant feature of the invention resides in the use of air-cushioned bellows having a high degree of resiliency acting in cooperation with spring elements of low resiliency to afford protection both against shock and vibration and to provide dampening in all directions.

Also an object of the invention is to provide a device of the above-described type which is of simple and sturdy construction and which may be readily manufactured and sold at a reasonable cost.

For a better understanding of the invention as well as other objects and further features thereof, reference is had to the following detailed description to be read in conjunction with the accompanying drawing, wherein like components in the various views are identified by like reference numerals.

In the drawings:

Figure 1 is a sectional view of a shock absorption and vibration isolator mount in accordance with the invention.

Figure 2 is a plan view of the mount shown in Fig. 1.

Figure 3 is a perspective of the mount.

Figure 4 is an alternative embodiment of the invention.

Referring now to the drawing and more particularly to Figs. 1 to 3, the shock absorption and vibration isolator according to the invention comprises a cylindrical metal bellows 10 mounted in an upright position on a rectangular base plate 11. The lower end of the bellows is welded or otherwise secured to a centrally disposed raised portion 11a of the base plate whereby the lower end of the bellows is hermetically sealed. Secured to the upper end of the bellows is a disc-shaped top plate 12 having a small orifice 13 therein. Thus the bellows constitute an air-tight enclosure except for the small orifice.

Mounted centrally on the under side of top plate 12 is a cylindrical socket member 14 having a threaded bore 15 in registration with an opening in the top plate and adapted to receive a mounting stud projecting from the load to be supported. The means for attaching the load to the top plate of the mount forms no part of the invention. Obviously the nature of these means must be designed to meet specific load requirements.

Surrounding the upper portion of bellows 10 is a frustro-conical cap 16. The upper end of cap 16 is provided with an inwardly directed flange 17 secured to the upper end of the bellows, the lower end having an outwardly directed flange 18. Concentrically disposed about the bellows and the cap is an outer casing 19 having an inwardly directed flange 20 at the upper end thereof and an outwardly directed flange 21 at the lower end, flange 21 being secured to base plate 11. Eyelets 24 are provided in the four corners of the base plate to facilitate attachment of the mount to a supporting surface.

Interposed between the flange 20 on the casing and the flange 18 on the cap is a tapered or conically-shaped helical spring 22, formed of metal having a relatively low resilience. The small end coil of the spring engages flange 18, while the large end coil is spaced from flange 20 and will make contact only when a shock is delivered to the mount. Interposed between flange 18 and base plate 11 is a second conically-shaped helical spring 23 also of low resilience metal, the large end coil of the spring being spaced from the base plate. Thus the springs 22 and 23 act in opposing directions.

The metal bellows 10 responds in the manner of a helical spring operating in all directions, the flexibility of the bellows depending on the type of metal used, the wall thickness and the number of convolutions. Compression of the bellows will result in compressing the air contained therein, the air being slowly released through the small orifice to provide air damping of the bellows isolator in all directions. Forced vibrations will cause the metal bellows to have motion in the vertical, horizontal and transverse directions. Rotation about these axes will cause the volume of air within the bellows to change, the air flowing in or out of the orifice. The work involved in forcing air through the orifice serves to convert some of the energy due to vibration, thereby attenuating the vibratory forces.

Temperature variations do not appreciably affect the damping characteristics of the bellows, for the viscosity of the air does not vary significantly as a function of temperature, and successful operation is obtained in both the high and low temperature ranges. Nor does altitude have any material effect on the damping.

The convolutions of the bellows shown in Fig. 1 are of uniform diameter, thus making the bellows a linear spring whereby the natural frequency of the spring decreases with increased load. Alternatively the bellows, as shown in Fig. 4, may be shaped conically whereby successively convolutions are progressively increased in diameter, going from the top to the bottom. Such conical bellows give rise to a non-linear spring action so that the natural frequency remains substantially constant over a wide load range.

The conical coil springs 22 and 23 function to absorb shock, the springs having non-linear characteristics whose stiffness increases as the deflection becomes greater. Since these springs are of low resilience, they require a large force to yield a small deflection and the face deflection curve will assume the appearance of a tangent function.

When the isolator receives a shock impulse, the bellows 10 will also function to provide damping to the coil springs 22 and 23 as they make contact with the sides, the top or the bottom of the outer casing depending on the direction of the shock wave. Thus the size of the orifice restricts the rate at which air may escape and creates air springiness which acts as a cushion against shock waves.

While there has been shown what is considered to be preferred embodiments of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A shock absorption and vibration isolating mount comprising a vertically mounted bellows adapted to support a load, said bellows being air-tight except for a small orifice permitting the escape of air therefrom at a relatively slow rate, and spring means having a resilience relatively lower than the resilience of said bellows, spring supporting means fixed to said bellows and supporting said spring means in non-load supporting position when said bellows is in load supporting position, stop means disposed to engage said spring means on distortion of said bellows beyond load supporting position to permit said spring means to absorb shock impulses only upon distortion of said bellows beyond load supporting position.

2. A shock absorption and vibration isolating mount comprising a vertically mounted metallic bellows adapted to support a load and having relatively high resilience, said bellows being air-tight except for a small orifice permitting the escape of air therefrom at a relatively slow rate, and coil spring means surrounding said bellows having a resilience relatively lower than said bellows, means fixed to said bellows and supporting said coil spring means in a non-load supporting position when the bellows is in normal load supporting position and stop means disposed to engage said coil spring means on distortion of said bellows beyond normal load supporting position whereby said spring means may absorb shock impulses.

3. A mount, as set forth in claim 2, wherein said bellows has a cylindrical shape whereby the convolutions thereof are of uniform diameter.

4. A shock absorption and vibration isolating mount comprising a vertically mounted bellows adapted to support a load, said bellows being air-tight except for a small orifice permitting the escape of air therefrom at a relatively slow rate, and coil spring means surrounding said bellows having a resilience relatively lower than said bellows, means fixed to said bellows and supporting said coil spring means in a non-load supporting position when the bellows is in normal load supporting position and stop means disposed to engage said coil spring means on distortion of said bellows beyond normal load supporting position whereby said spring means may absorb shock impulses, said bellows being formed of metal and having a frusto-conical shape whereby successive convolutions thereof are of progressively different diameter.

5. A shock absorption and vibration isolation device comprising a base plate, a bellows vertically mounted on said base plate, said plate enclosing the lower end of said bellows, a top plate secured to the upper end of said bellows and having a small orifice therein whereby said bellows is air-tight save for said orifice, said top plate being adapted to support a load on said bellows, a cap surrounding the upper portion of said bellows and having an inwardly directed flange at the upper end secured to the upper end of said bellows and having an outwardly directed flange at the lower end thereof, a casing mounted on said base plate and surrounding said cap and said bellows and having an inwardly directed flange at its end opposite said base plate, a first helical spring within said casing and surrounding said cap, said first spring having one end secured to the lower flange of said cap, and a second helical spring within said casing and surrounding the portion of said bellows below said cap, said second spring having one end secured to the lower flange of said cap, the free ends of said springs being normally out of contact with said base plate and the inwardly directed flange of said casing when said bellows is in load supporting position but adapted upon the application of shock loads resulting in compression or extension of said bellows to bear respectively upon either said base plate or said flange of said casing.

6. A mount as set forth in claim 5 wherein said springs are constituted by oppositely directed conical helices formed of low resilience wire.

7. A shock absorption and vibration isolation mount comprising a base plate, a metallic bellows of high resiliency vertically mounted on said base plate, said plate enclosing and hermetically sealing the lower end of said bellows, a top plate secured to the upper end of said bellows and having a small orifice therein whereby said bellows is air-tight save for said orifice, said top plate being adapted to support a load on said bellows, a frusto-conical cap surrounding the upper portion of said bellows and secured at its upper end to said top plate, said cap at its lower end having an outwardly extending flange, an outer casing concentrically surrounding said bellows and said cap and secured at its lower end to said base plate, said casing having an inwardly directed flange at the upper end thereof, a first coil spring interposed between said top flange of said casing and said bottom flange of said cap and secured to the latter, and a second coil spring interposed between said bottom flange and said base plate and secured to the former, said springs being of relatively low resiliency and being normally out of contact with said base plate and said upper flange of said casing.

8. A mount, as set forth in claim 7, wherein said bellows is of cylindrical shape such that the convolutions thereof are of uniform diameter.

9. A mount, as set forth in claim 8, wherein said bellows is of conical shape whereby the convolutions thereof are of progressively different diameter.

References Cited in the file of this patent

UNITED STATES PATENTS

| | | |
|---|---|---|
| 214,328 | Vose | Apr. 15, 1879 |
| 1,956,108 | Symington | Apr. 24, 1934 |
| 2,572,919 | French et al. | Oct. 30, 1951 |
| 2,610,017 | Lambert et al. | Sept. 9, 1952 |